United States Patent Office 3,284,426
Patented Nov. 8, 1966

3,284,426
CRYSTALLINE POLY(VINYL ETHERS) AND
PREPARATION THEREOF
Edwin J. Vandenberg, Blue Rock Manor, Wilmington, Del., assignor to Hercules Incorporated, a corporation of Delaware
No Drawing. Filed Mar. 18, 1957, Ser. No. 646,539
10 Claims. (Cl. 260—91.1)

This application is a continuation-in-part of my application U.S. Serial No. 595,819, filed July 5, 1956, which is in turn a continuation-in-part of my application U.S. Serial No. 579,425, filed April 20, 1956, both of which applications have been abandoned.

This invention relates to a new process of polymerizing vinyl ethers and to the production of new poly(vinyl alkyl ethers) which are characterized by their high degree of crystallinity and by being insoluble in cold water, alcohol, etc.

It is well known that vinyl ethers may be polymerized in bulk or solution with Friedel-Crafts catalysts to yield polymers that vary from viscous liquid to balsam-like or soft resinous-like polymers. Under certain conditions and using boron trifluoride-etherates as catalysts it has been possible to produce a crystalline type of poly(vinyl methyl ether) and poly(vinyl isobutyl ether). While a solid poly(vinyl ethyl ether) has been produced, it was not crystalline. In the case of both the balsam-like and crystalline-type poly(vinyl methyl ether) and poly(vinyl ethyl ether) of the prior art, the polymer is completely soluble in cold water and in organic solvents such as methanol, ethanol, acetone, and benzene. Because of the extreme solubility of these polymers, their utility has been considerably limited.

Now in accordance with this invention it has been found that vinyl ethers may be polymerized by contacting the vinyl ether with a catalyst formed by mixing a compound of a metal of Groups IV–B or V–B of the Periodic Table with an organometallic compound of a metal of Groups I, II or III of the Periodic Table. It has also been discovered that in many cases, and especially in the case of vinyl methyl ether and vinyl ethyl ether, the vinyl ether polymers produced by the process of this invention differ from those of the prior art in that they are crystalline and have entirely different solubility characteristics from those of the prior art.

The poly(vinyl methyl ether) produced in accordance with this invention has a very high degree of crystallinity and exhibits a very definite X-ray diffraction powder pattern. The crystal lattice spacings and relative intensities of the diffraction lines of this new poly(vinyl methyl ether) are as follows:

Crystal lattice spacings $d$: | Approximate relative intensities (on a scale of 10)
---|---
8.0 A. | 4
5.8 | 1
4.7 | 3
4.09 | 10
3.44 | 2
3.18 | 2
2.78 | 1
2.39 | 0.5
2.11 | 1

This new crystalline poly(vinyl methyl ether) is also characterized by its solubilities inasmuch as it is insoluble in cold water, in methanol and ethanol, and is only swollen in cyclohexanone and benzene, but is generally soluble in boiling cyclohexanone.

In the same way, the poly(vinyl ethyl ether) of this invention has a very high degree of crystallinity and exhibits a very definite X-ray diffraction powder pattern. The crystal lattice spacings and relative intensities of the diffraction lines of this new poly(vinyl ethyl ether) are as follows:

Crystal lattice spacings $d$: | Approximate relative intensities (on a scale of 10)
---|---
10.6 | 5
9.9 | 10
6.06 | 2
5.68 | 2
4.92 | 5
4.57 | 10
4.15 | 4
3.78 | 5
2.80 | 2

This new crystalline poly(vinyl ethyl ether) is also characterized by its solubilities in that it is insoluble in cold water, in methanol and ethanol, and partly soluble in boiling benzene.

Any vinyl ether, as for example, vinyl alkyl ethers, vinyl cycloalkyl ethers, vinyl aralkyl ethers or vinyl aryl ethers, may be polymerized by the process of this invention. Exemplary of these vinyl ethers that may be so polymerized are the vinyl alkyl ethers such as vinyl methyl ether, vinyl ethyl ether, vinyl 2-chloroethyl ether, vinyl 2-methoxyethyl ether, vinyl 2-cyanoethyl ether, vinyl propyl ether, vinyl isopropyl ether, vinyl n-butyl ether, vinyl isobutyl ether, vinyl tert-butyl ether, vinyl neopentyl ether, vinyl n-hexyl ether, vinyl 2-ethylhexyl ether, vinyl stearyl ether, etc., the vinyl cycloalkyl ethers such as vinyl cyclohexyl ether, vinyl α-terpinyl ether, vinyl isobornyl ether, etc., the vinyl aralkyl ethers such as vinyl benzyl ether, vinyl p-chlorobenzyl ether, vinyl α,α-dimethylbenzyl ether, etc., and the vinyl aryl ethers such as vinyl phenyl ether, vinyl p-methylphenyl ether, vinyl p-chlorophenyl ether, vinyl α-naphthyl ether, etc. Any mixture of these vinyl ethers may likewise be polymerized.

The polymerization of vinyl ethers in accordance with this invention may be carried out in a wide variety of ways. The process may be a batch or continuous operation and may be carried out with or without the use of an inert organic diluent as the reaction medium. Any inert liquid organic diluent may be used, as for example, aliphatic hydrocarbons such as hexane, heptane, etc., cycloaliphatic hydrocarbons such as cyclohexane, aromatic hydrocarbons such as benzene, toluene, xylene, etc., or any mixture of such hydrocarbons, halogenated hydrocarbons such as ethyl chloride, methyl chloride, methylene chloride, ethylene chloride, chlorobenzene, and aliphatic ethers, cycloaliphatic ethers, aromatic ethers, and cyclic ethers, as for example, diethyl ether, dioxane, tetrahydrofuran, etc.

The selection of the temperature and pressure used for the polymerization process will depend upon the activity of the catalyst system being used, the diluent used, etc. In general, the polymerization will be carried out at room temperature or slightly above, but any temperature within the range of from about —80° C. to about 150° C., and preferably from about —50° C. to about 100° C., may be used. In the same way, while atmospheric pressure or a pressure of only a few pounds may be used, the polymerization may be carried out under a wide range of pressures, as for example, from a partial vacuum to about 1000 pounds, and preferably from about atmospheric to about 500 pounds pressure. Higher pressures may, of course, be used, but generally do not appreciably alter the course of the polymerization.

The polymerization of the vinyl ethers in accordance with this invention is carried out by using as the catalyst for the polymerization a combination of a compound of a metal of Groups IV–B or V–B of the Periodic Table with an organo-metallic compound of a metal of Groups I, II or III of the Periodic Table. Any compound of a Group IV-B or Group V-B metal, i.e., titanium, zirconium, hafnium, thorium, vanadium, niobium, or tantalum, may be used, as for example, any inorganic salt or oxide or organic salt or complex of the metal. Exemplary of the compounds that may be so used as one of the catalyst components are the halides such as titanium tetrachloride, titanium trichloride, titanium dichloride, vanadium dichloride, vanadium trichloride, vanadium trifluoride, vanadium oxychloride, and vanadium oxydichloride, etc., or the oxides such as vanadium trioxide, vanadium pentoxide, etc., or organic compounds such as vanadium oxyacetylacetonate, alkyl vanadates, alkyl titanates, etc., and the corresponding compounds of zirconium, hafnium, thorium, niobium, and tantalum. There may also be used the reaction product produced by mixing a compound such as titanium tetrachloride or vanadium tetrachloride with an organometallic compound of a metal selected from Groups I, II or III of the Periodic Table. When a compound such as titanium tetrachloride, vanadium tetrachloride, vanadium oxytrichloride, or vanadium oxydichloride is mixed with an organometallic compound of a metal of Groups I, II or III, i.e., an alkali metal, alkaline earth metal, zinc, or aluminum, a reaction takes place which is believed to be a reduction of the transition metal compound from one of its higher valence states to one or more of its lower valence states. In general, it is preferable to select a compound of a Group IV-B or Group V-B metal such that it is insoluble or poorly soluble in the reaction diluent or one that is converted to this state by treatment with an organometallic reducing agent as in the case of vanadium tetrachloride, etc.

In carrying out the above-described reaction of titanium or vanadium tetrachloride or other compound of a Group IV-B or V-B metal with an organometallic compound prior to its use in the polymerization system, any organometallic compound of a metal of Groups I, II or III may be used. Exemplary of such organometallic compounds are the alkali metal alkyls or aryls such as butyllithium, amylsodium, phenylsodium, etc., dimethyl magnesium, diethyl magnesium, diethyl zinc, butyl magnesium chloride, phenyl magnesium bromide, ethyl magnesium methoxide, triethylaluminum, tributylaluminum, triisobutylaluminum, trioctylaluminum, tridodecylaluminum, dimethylaluminum chloride, diethylaluminum bromide, diethylaluminum chloride, ethylaluminum dichloride, the equimolar mixture of the latter two known as aluminum sesquichloride, dipropylaluminum fluoride, diisobutylaluminum fluoride, diisobutylaluminum chloride, diethylaluminum hydride, ethylaluminum hydride, diisobutylaluminum hydride, ethylaluminum dimethoxide, ethylaluminum diisopropoxide, ethylaluminum di-tert-butoxide, isobutylaluminum dimethoxide, isobutylaluminum diisopropoxide, isobutylaluminum di-tert-butoxide, etc., and complexes of such organometallic compounds, as for example, sodium aluminum tetraethyl, lithium aluminum tetraoctyl, sodium aluminum triethyl chloride, etc. If the organometallic compound used is one that is insoluble in the reaction mixture, it may be desirable to reduce its particle size by ball-milling prior to using it in the reaction. The molar ratio of the organometallic compound to the titanium, vanadium, or other Group IV-B or V-B metal compound in carrying out the reaction may be varied over a wide range, but usually there should be used an amount of the organometallic compound that will produce the desired amount of reduction. Thus, larger ratios of organometallic compound to the transition metal compound are required for alkali metal alkyls than for trialkylaluminum compounds, etc. In general, the reaction is carried out by mixing the transition metal compound and the organometallic compound in an inert organic diluent. The insoluble precipitate which is formed may be separated from the inert diluent and then added to the polymerization system alone or in combination with additional organo-aluminum compound. This separation of the insoluble reaction product from the diluent may be carried out by means of centrifugation, filtration, etc. In some cases it may be desirable to wash the insoluble reaction product with additional amounts of the diluent in order to completely remove all of the soluble by-products, particularly if they are acidic in nature. On the other hand, the suspension of the reaction product produced may be used directly in the polymerization system without going through the separation step. The reaction product may be used immediately or it may be aged by allowing the reaction mixture to stand at room temperature for anywhere from a few minutes to several hours or longer, or it may be subjected to a heat treatment, i.e., heating the reaction mixture at elevated temperatures.

In carrying out the polymerization of vinyl ethers with the combination of a Group IV-B or V-B metal compound with an organometallic compound, it is usually preferable to utilize the Group IV-B or V-B metal compound in a finely divided form. Such a finely divided form is obtained when the compound is reduced with the organometallic compound prior to the polymerization as described above. Another means of obtaining a finely divided form of the Group IV-B or V-B metal compound that is used in the polymerization is to subject that compound, as for example, vanadium trichloride, vanadium oxydichloride, tantalum pentachloride, etc., to a ball-milling operation carried out in an inert diluent. By such means it is possible to produce the compound in almost any desired particle size.

As pointed out above, any organometallic compound of a metal of Groups I, II or III of the Periodic Table may be used in combination with the Group IV-B or V-B metal compound to catalyze the polymerization of vinyl ethers in accordance with this invention. While any of the alkali metal, alkaline earth metal, or aluminum organometallic compounds, already exemplified above, may be used for carrying out the catalysis of the polymerization in accordance with this invention, organometallic compounds of metals of Groups II and III are of particular advantage in the process, and even more preferred is the use of an organoaluminum compound, examples of which have already been cited above. Particularly preferred are the relatively nonacidic organoaluminum compounds such as the aluminum trialkyls which do not polymerize vinyl methyl ether alone.

Any mode of introducing the two catalyst components into the polymerization system may be utilized. Usually the organometallic compound and the Group IV-B or V-B metal compound are added in the form of solutions or suspensions in inert diluents. Either one may be introduced into the system followed by the second or they may be introduced simultaneously, or they may be added in increments or continuously. The amount of the two catalyst components used may be varied over a wide range but, in general, the molar ratio of the organometallic compound to the transition metal compound will be within the range of from about 0.1:1 to about 20:1 and preferably from about 0.3:1 to about 10:1.

In carrying out the polymerization of vinyl ethers in accordance with this invention, it is frequently desirable to incorporate in the reaction mixture a complexing agent for the organometallic compound used for the polymerization. Just what may be the function of the complexing agent is not completely understood, but it is believed that it forms a complex with the organometallic compound to prevent any undesirable side reactions which might otherwise take place between the organometallic compound and the monomer or polymer. Any compound that will form a loose type of complex (possibly functioning as an electron donor) with the organometallic compound may be used, as for example, ethers, tertiary amines, esters, ketones, nitroaromatics, etc., such as diethyl ether, tetrahydrofuran, triethylamine, and ethyl acetate. In some cases it may be desirable to use the complexing agent, as for example, diethyl ether or tetrahydrofuran, as the major component of the inert organic diluent being used for the polymerization process.

Obviously, many variations may be made in the process of this invention. For example, in some instances, it may be desirable to add hydrogen to the polymerization system in order to control or reduce the molecular weight of the polymer.

The following examples will illustrate the process of polymerizing vinyl ethers in accordance with this invention and the production thereby of new poly(vinyl ethers) in accordance with this invention. The molecular weight of the polymers produced in these examples is indicated by the Reduced Specific Viscosity (RSV) given for each. By the term "Reduced Specific Viscosity" is meant the $\eta$sp./c. determined on a 0.1% solution (0.1 g. of the polymer per 100 ml. of solution) of the polymer in cyclohexanone at 135° C. or in benzene at 25° C. unless otherwise indicated. All parts and percentages are by weight unless otherwise indicated.

*Examples 1 and 2*

To each of two polymerization vessels from which the air had been removed and replaced with nitrogen was charged 30 parts of n-heptane, 10 parts of vinyl methyl ether, and 0.40 part of triisobutylaluminum in 1.3 parts of n-heptane. In Example 1 there was then added 0.16 part of vanadium trichloride, ball-milled in 5 parts of n-heptane. To the polymerization mixture of Example 2 there was added the suspension of insoluble reaction product produced by mixing 0.041 part of triethylaluminum with 0.19 part of vanadium tetrachloride in 2.7 parts of n-heptane, allowing this mixture to stand for 2 hours at room temperature, and then heating it for 16 hours at 90° C. The polymerization reaction mixtures were agitated and held at 30° C. for 19 hours, after which the polymerization was stopped by adding 4 parts of anhydrous ethanol. The insoluble polymer which had separated was centrifuged, washed with 100 parts of a 50/50 mixture of methanol and ethanol. The polymer was again centrifuged, washed with ethanol, and dried for 1 hour at room temperature in vacuum. The polymer so obtained in each case was then purified by dissolving in boiling cyclohexanone to which 0.2% of phenyl-β-naphthylamine had been added, the solution filtered while hot, and the polymer reprecipitated by adding a large excess of n-heptane containing 0.2% phenyl-β-naphthylamine. The polymer was separated by filtration and then dried in vacuo for 4 hours at 80° C.

The alcohol-insoluble polymer obtained in each case was a slightly extensible solid having a tendency to adhere to glass quite strongly. These polymers were insoluble in cold (25° C.) water, methanol, and ethanol and were highly swollen in cyclohexanone and benzene. The polymer obtained in Example 1 had a reduced specific viscosity of 1.11 as determined on a solution in cyclohexanone at 135° C. and a melting point of 150° C. The polymer obtained in Example 2 had a reduced specific viscosity of 0.83 in cyclohexanone at 135° C. and a melting point of 120° C. Each of these polymers exhibited a crystalline-type X-ray diffraction powder pattern. In both cases the polymer, when melted and then cooled partially, was capable of being formed into films and fibers which, when stretched while warm, gave strong films and fibers.

*Example 3*

Example 1 was repeated except that 21 parts of diethyl ether was substituted for the heptane charged to the polymerization vessel in that example. The polymer was isolated by adding to the reaction mixture, after stopping the polymerization, a large excess of diethyl ether, washing the reaction mixture with water, separating the ether layer, removing the ether, and then adding 200 parts of water. The water-insoluble polymer so obtained was collected, washed once with water, dried for 16 hours at room temperature in vacuo, then washed three times with methanol and redried for 16 hours at room temperature in vacuo. It was further purified by dissolving in boiling benzene, filtering the solution while hot, removing the benzene, and finally drying the polymer for 22 hours at room temperature in vacuum. By spreading a hot benzene solution of the polymer on glass and heating to remove the benzene, there was obtained a clear, tough film which adhered very strongly to the glass. An X-ray diffraction powder pattern showed this polymer to have a high degree of crystallinity.

*Example 4*

Example 2 was repeated except that 34 parts of tetrahydrofuran was used as the polymerization diluent in place of the heptane. At the end of the polymerization, the reaction mixture was centrifuged to remove the insoluble inorganic materials, the latter were washed with 150 parts of tetrahydrofuran, and the tetrahydrofuran solutions were then combined and concentrated. There was then added 5 volumes of water whereupon the polymer precipitated. The total mixture was distilled to remove the n-heptane that had been added with the catalyst solutions, after which the insoluble polymer was separated by filtration, washed with water, and dried in vacuo for 16 hours at room temperature. This polymer was purified by dissolving it in boiling benzene, filtering the benzene solution, and removing the benzene by freeze-drying. After washing the polymer three times with methanol, it was dried for 4 hours at 80° C. in vacuo. The poly(vinyl methyl ether) so obtained had a reduced specific viscosity of 0.38 in cyclohexanone and was insoluble in cold water, methanol, and benzene. It was highly crystalline as shown by its X-ray diffraction powder pattern and had a crystalline melting point of 133° C.

*Examples 5 and 6*

Each of two polymerization vessels from which the air had been removed and replaced with nitrogen was charged with 10 parts n-heptane, 12 parts of vinyl methyl ether, and 0.40 part of triisobutylaluminum in 1.3 parts of n-heptane. For Example 5 there was then added 0.36 part of tantalum pentachloride ball-milled in 6.2 parts of n-heptane; for Example 6 there was added to the polymerization mixture 0.18 part of vanadium pentoxide ball-milled in 2.4 parts of n-heptane. The polymerization was stopped in each case after 18 hours at 30° C., by adding 1.6 parts of butanol. In each case 150 parts of anhydrous ethanol was added to the polymerization reaction mixture and after separating the polymer, it was washed twice with anhydrous ethanol and dried. The polymer obtained in Example 5 was extracted with boiling benzene and then with boiling xylene. The polymer remaining after removal of the xylene from the xylene extract was redissolved in boiling benzene, the solution filtered, and the benzene removed by freeze-drying. The polymer was washed twice with methanol and dried for 16 hours at room temperature and then 2 hours at 80° C. in vacuum. It was highly crystalline as shown by its X-ray diffraction powder pattern and had a melting point of 115° C. The polymer produced in Example 6 was purified by treating it with 10% methanolic hydrogen chloride, washing with methanol until neutral, and then dissolving in boiling benzene, filtering, and removing the benzene by distillation, after which it was dried for 4 hours at 80° C. The poly(vinyl methyl ether) so obtained had the typical X-ray diffraction powder pattern described above.

*Example 7*

A polymerization vessel freed of air was charged with 10.3 parts of n-heptane, 10.8 parts of vinyl methyl ether, and 0.40 part of triisobutylaluminum in 1.4 parts of n- heptane. After equilibrating at 30° C., there was added the suspension of insoluble reaction product produced by mixing 0.039 part of triethylaluminum with 0.19 part of titanium tetrachloride in 5.4 parts of n-heptane, allowing this mixture to stand at room temperature for 2 hours and then heating it for 16 hours at 90° C. The polymerization reaction mixture was agitated and held at 30° C. for 19 hours, after which the polymerization was stopped by adding 4 parts of anhydrous ethanol. The reaction mixture was then diluted with an additional 120 parts of anhydrous ethanol, and the insoluble polymer which had separated was centrifuged, washed twice with anhydrous ethanol, and then dried for 16 hours at room temperature in vacuum. The polymer so obtained had a reduced specific viscosity of 0.31 as determined in cyclohexanone at 135° C. It was purified by dissolving it in boiling benzene, filtering the benzene solution, and then freeze-drying to isolate the polymer, after which the polymer was washed three times with methanol and then dried for 16 hours at room temperature and finally 2 hours at 80° C. in vacuum. This polymer exhibited a high degree of crystallinity as shown by its X-ray diffraction powder pattern.

*Example 8*

A polymerization vessel freed from air was charged with 13 parts of n-heptane, 10.8 parts of vinyl methyl ether, and 0.40 part of triisobutylaluminum in 1.4 parts of n-heptane. After equilibrating at 30° C., there was added 0.15 part of titanium trichloride in 2.7 parts of n-heptane, which suspension had been ball-milled for 6 hours. The polymerization mixture was agitated and held at 30° C. for 19 hours, after which the polymer was isolated and purified as described in Example 7. An X-ray diffraction powder pattern of this polymer showed that it had the same X-ray diffraction powder pattern as described above and had a high degree of crystallinity.

*Examples 9 to 16*

In each of these examples a polymerization vessel freed of air was charged with 10.0 parts of the specified vinyl ether, 17.8 parts of n-heptane and 0.80 part of triisobutylaluminum in 2.7 parts of n-heptane. After equilibrating at 30° C., there was added the suspension of insoluble reaction product produced by: mixing 0.19 part of vanadium tetrachloride with 0.04 part of triethylaluminum in 2.7 parts of n-heptane, allowing this mixture to stand at room temperature for two hours and then heating it for 16 hours at 90° C. after which an equal volume of n-heptane was added to the mixture and the hydrocarbon-insoluble product was separated, the latter washed with n-heptane and, after resuspending in 2.7 parts of n-heptane, adding 0.40 part of triisobutylaluminum in 10.9 parts of n-heptane and allowing the mixture to stand for five minutes at room temperature. The polymerization reaction mixture was agitated and held at 30° C. for 18 hours. The vinyl ether polymerized in each example and the isolation of the polymer produced is set forth below.

*Example 9.—Poly(vinyl ethyl ether)*

A solids determination on an aliquot of the viscous reaction mixture obtained on so polymerizing vinyl ethyl ether showed that the monomer was 100% polymerized and that the polymer which was tough and rubbery had a relatively high molecular weight and had an RSV of 1.2 in benzene at 25° C. To this polymerization reaction mixture was added 150 parts of anhydrous ethanol and the insoluble polymer was separated by centrifugation, washed twice with anhydrous ethanol and, after adding 0.5%, based on the polymer, of a commercial antioxidant known as Santowhite [4,4'-thiobis(6-tert-butyl-meta-cresol)] in anhydrous ethanol, was dried for 16 hours in vacuum at room temperature. Inorganics were removed by treatment for two hours at room temperature with a 10% hydrogen chloride solution in methanol after which the polymer was again washed with anhydrous methanol and dried. It was a purple, film-like solid. An X-ray diffraction powder pattern showed it to be highly crystalline. It was then further purified by dissolving in boiling benzene, filtering the benzene solution while hot, and after removing the benzene, by distillation, the polymer was washed with methanol and again dried. The purified polymer so obtained was a white film-like solid. Its X-ray pattern showed it to be highly crystalline and to have the typical X-ray diffraction powder pattern described above. This poly(vinyl ethyl ether) was insoluble in cold water, methanol and ethanol and partly soluble in boiling benzene.

*Example 10.—Poly(vinyl methyl ether)*

A solids determination on the reaction mixture produced with vinyl methyl ether showed a 100% conversion to polymer. The polymer was isolated and purified by the method described in Example 9. The methanol- and ethanol-insoluble poly(vinyl methyl ether) so obtained had the typical crystalline X-ray diffraction powder pattern set forth above and had a reduced specific viscosity of 3.5 as determined in cyclohexanone at 135° C.

*Example 11.—Poly(vinyl n-butyl ether)*

A 100% conversion to polymer was obtained with vinyl n-butyl ether. The polymerization was stopped by adding 4 parts of anhydrous ethanol after which the reaction mixture was diluted with n-heptane, thoroughly washed with a 3% methanolic solution of hydrogen chloride, with water until neutral, with 5% aqueous sodium hydroxide, and again with water until neutral. The polymer was then precipitated by pouring the washed reaction mixture into a large excess of anhydrous ethanol containing 0.2% of Santowhite and the polymer was collected and dried to constant weight. It amounted to a conversion of 75%. This poly(vinyl n-butyl ether) was a very tacky rubbery polymer having an RSV of 1.2 in cyclohexanone at 135° C. and 3.0 in benzene at 25° C.

*Example 12.—Poly(vinyl isobutyl ether)*

A 95% conversion to polymer was obtained with vinyl isobutyl ether. The polymerization was stopped and the reaction mixture washed with methanolic hydrogen chloride and water as in Example 11. The n-heptane-insoluble polymer produced in this case was separated, washed with n-heptane and anhydrous ethanol to which 0.5% wased on the polymer of Santowhite had been added. On drying the poly(vinyl isobutyl ether) so obtained was a white, tough, extensible solid shown to be highly crystalline by X-ray. It was insoluble in n-heptane and benzene at room temperature and had an RSV of 1.3 in cyclohexanone at 135° C. A sample on further purification by dissolving in boiling xylene, filtering the solution and reprecipitating in methanol, washed and dried had on analysis a carbon and hydrogen content in agreement with the theoretical values. The heptane-slouble fraction of poly(vinyl isobutyl ether) was isolated by concentrating the heptane filtrate and washes and then precipitating in anhydrous ethanol containing 0.1% Santowhite. On collecting and drying there was obtained a tacky, gel-like, rubbery solid having an RSV of 1.1 in cyclohexanone at 135° C.

*Example 13.—Poly(vinyl stearyl ether)*

A 100% conversion was obtained with vinyl stearyl ether. The n-heptane-insoluble and n-heptane-soluble poly(vinyl stearyl ethers) were isolated by the method described for poly(vinyl isobutyl ether) in Example 12. The heptane-insoluble polymer was a hard solid that had an X-ray diffraction powder pattern similer to that of a crystalline straight chain hydrocarbon. The heptane-soluble polymer was a hard, waxy, opaque solid having an RSV of 0.5 in benzene at 25° C.

Example 14.—Poly(vinyl tert-butyl ether)

A conversion of 88% was obtained with vinyl tert-butlyl ether. The reaction mixture was washed with methanolic hydrogen chloride and water as described in Example 11 and then with 5% aqueous sodium hydroxide and again with water after which the n-heptane-insoluble polymer was isolated as described in Example 11. The poly(vinyl tert-butyl ether) so obtained was a white, powdery solid, insoluble in n-heptane, benzene and cyclohexanone at room temperature but soluble in boiling cyclohexanone. It was shown by X-ray to be highly crystalline and had a melting point >238° C. Analysis showed it to have a carbon and hydrogen content in agreement with the theoretical. It had an RSV of 0.2 as determined on an 0.04% solution in cyclohexanone at 135° C.

Example 15.—Poly(vinyl isobornyl ether)

A 62% conversion was obtained with vinyl isobornyl ether. The reaction mixture was treated and the n-heptane-soluble and -insoluble polymers so obtained were isolated by the procedure described in Example 12. The heptane-insoluble poly(vinyl isobornyl ether) was shown to be crystalline by X-ray. The heptane-soluble polymer was a white powder having an RSV of 0.02 in benzene at 25° C.

Example 16.—Poly(vinyl α-terpinyl ether)

A 62% conversion to polymer was obtained with vinyl α-terpinyl ether. Both a heptane-insoluble and heptane-soluble poly(vinyl α-terpinyl ether) was obtained when the reaction mixture was treated and the polymers isolated as in Example 12.

Example 17

Vinyl benzyl ether was polymerized by the same procedure as described above for Examples 9 to 16 except that toluene was used as the diluent charged to the polymerization vessel instead of n-heptane. A solids determination on the reaction mixture after 18 hours showed a conversion of 95%. Both a toluene-soluble and -insoluble poly(vinyl benzyl ether) was obtained when the reaction mixture was treated and the polymers isolated as in Example 12.

Examples 18 and 19

The polymerization procedure used in these examples for the polymerization of vinyl n-propyl ether in Example 18 and vinyl isopropyl ether in Example 19 was the same as that described for Examples 9 to 16 except that 21.8 parts of n-heptane instead of 17.8 parts was charged to the polymerization vessel and 0.58 part of monoisobutylaluminum dimethoxide in 5.4 parts of n-heptane was used in place of the 0.80 part of triisobutylaluminum in 2.7 parts of heptane used in those examples. After 17 hours at 30° C. a total solids indicated a conversion of 97% of vinyl propyl ether to polymer and 92% of vinyl isopropyl ether to polymer. The polymerization was stopped and the heptane-insoluble polymers were isolated by the procedure described in Example 12. The heptane-soluble polymers were isolated by distilling off the heptane from the filtrate after adding 0.5% Santowhite (based on the polymer) and then drying. The heptane-soluble poly(vinyl n-propyl ether) had an RSV of 1.3 in benzene at 25° C. and the heptane-soluble poly(vinyl isopropyl ether) had an RSV of 0.2 in benzene at 25° C. The heptane-insoluble poly(vinyl isopropyl ether) was a highly crystalline polymer as shown by its X-ray diffraction powder pattern, had an RSV of 0.6 as determined on an 0.05% solution in cyclohexanone at 135° C. and had a melting point of 191° C.

The new crystalline poly(vinyl methyl and ethyl ethers) produced in accordance with this invention, unlike the previously known poly(vinyl methyl and ethyl ethers), are insoluble in cold water and in methanol. Hence, they may be used for many applications that were not previously possible. As may be seen from the foregoing examples, poly(vinyl methyl ether) has a relatively high crystalline melting point and may be formed into fibers and films which may be drawn to produce tough films and fibers. The new poly(vinyl ethyl ether) is also an excellent film-forming plastic. The films may be uniaxially or biaxially oriented by drawing. These polymers are also useful for the preparation of tough plastic articles. For many applications it may be desirable to incorporate antioxidants, pigments, fillers, plasticizers, etc., in these polymers before fabrication.

As may be seen from the foregoing examples, the process of this invention makes it possible to produce new crystalline poly(vinyl ethers). It also makes possible the production of high molecular weight amorphous poly(vinyl ethers) at ordinary temperatures. Another advantage of the process of this invention is the fact that in addition to the ordinary amorphous polymers and the new crystalline polymers it is possible to prepare poly(vinyl ethers) that are intermediate between rubbers and plastics.

The Periodic Table used in this specification and appended claims for designating the groups and subgroups of the Periodic Table is that of Mendeleeff as given in Deming's General Chemistry, sixth edition, 1952, John Wiley & Sons, Inc., New York, and in the Handbook of Chemistry and Physics, Chemical Rubber Publishing Company, Cleveland, Ohio, on page 392–3 of the 36th edition.

What I claim and desire to protect by Letters Patent is:

1. Crystalline poly(vinyl methyl ether) characterized as consisting of a solid homopolymer which is insoluble in cold water, methanol and n-heptane, having a high degree of crystallinity with a melting point of from 115° C. to 150° C., being capable of being formed into an unsupported film, having a reduced specific viscosity of at least about 0.3 as measured on a 0.1% solution of the polymer in cyclohexanone at 135° C., and exhibiting a crystalline-type X-ray diffraction powder pattern in which the $d$-spacings are at about 8.0, 5.8, 4.7, 4.09, 3.44, 3.18, 2.78, 2.39 and 2.11 angstroms.

2. The process of preparing a solid poly(vinyl ether) which comprises homopolymerizing a vinyl ether having the formula $CH_2=CH—O—R$ where R is a hydrocarbon radical free of aliphatic unsaturation, at a temperature of from about −80° C. to about 150° C. with a catalyst formed by reacting a compound of vanadium with an organometallic compound of a metal selected from the group consisting of alkali metals, alkaline earth metals, zinc, and earth metals in a molar ratio of from about 1:0.1 to about 1:20 respectively.

3. The process of claim 2 wherein the vinyl ether is a vinyl alkyl ether.

4. The process of claim 2 wherein the vinyl ether is a vinyl cycloalkyl ether.

5. The process of claim 2 wherein the vinyl ether is a vinyl aralkyl ether.

6. The process of preparing a solid poly(vinyl alkyl ether) which comprises homopolymerizing a vinyl alkyl ether at a temperature of from about −80° C. to about 150° C. with a two-component catalyst composition comprising (1) the reaction product produced by the reaction of a compound of vanadium with an organometallic compound of a metal selected from the group consisting of alkali metals, alkaline earth metals, zinc, and earth metals, in a molar ratio of from about 1:0.1 to about 1:20, respectively, and (2) an organometallic compound of a metal selected from the group consisting of alkali metals, alkaline earth metals, zinc, and earth metals in a molar ratio of component (1) to component (2) of from about 1:0.1 to about 1:20.

7. The process of preparing a solid poly(vinyl alkyl ether) which comprises homopolymerizing a vinyl alkyl ether at a temperature of from about −80° C. to about 150° C. with a catalyst formed by reacting a vanadium compound with an organoaluminum compound in a molar ratio of from about 1:0.1 to about 1:20, respectively.

8. The process of preparing a solid poly(vinyl alkyl ether) which comprises homopolymerizing a vinyl alkyl ether at a temperature of from about −80° C. to about 150° C. with a catalyst formed by reacting a vanadium prising (1) the reaction product produced by the reaction of a vanadium compound with an organoaluminum compound in a molar ratio of from about 1:0.1 to about 1:20, respectively, and (2) an organoaluminum compound in a molar ratio of component (1) to component (2) of from about 1:0.1 to about 1:20.

9. The process of claim 8 wherein the vinyl alkyl ether is vinyl methyl ether.

10. The process of claim 8 wherein the vinyl alkyl ether is vinyl tert-butyl ether.

References Cited by the Examiner

UNITED STATES PATENTS

| | | | |
|---|---|---|---|
| 2,482,056 | 9/1949 | Elwell et al. | 260—91.1 |
| 2,549,921 | 4/1951 | Mosley | 260—91.1 |
| 2,799,669 | 7/1957 | Zoss | 260—91.1 |
| 2,832,759 | 4/1958 | Nowlin et al. | 260—94.9 |
| 2,879,263 | 3/1959 | Anderson et al. | 260—94.9 |
| 2,932,633 | 4/1960 | Juveland et al. | |
| 2,964,455 | 12/1960 | Graham | 204—154 |
| 3,026,290 | 3/1962 | Gluesenkamp | 260—88.1 |
| 3,103,503 | 9/1963 | Fox et al. | 260—89.5 |
| 3,114,743 | 12/1963 | Horne | 260—94.7 |
| 3,118,864 | 1/1964 | Robinson et al. | 260—85.3 |

FOREIGN PATENTS

| | | |
|---|---|---|
| 533,362 | 5/1955 | Belgium. |
| 805,188 | 5/1951 | Germany. |

OTHER REFERENCES

Bilmeyer, Textbook of Polymer Science, Wiley, 1962.

Bovey et al.: Journal of Polymer Science, vol. 44, pp. 173–182, 1960.

Flory, Principles of Polymer Chemistry, Cornell University Press of Ithaca, N.Y., 1953, pages 237 and 238.

Hill, Fibers from Synthetic Polymers, Elsevier Publ. Co. of Amsterdam, Netherlands, 1953, page 232.

Mark et al.: Physical Chemistry of High Polymeric Systems, Interscience, 1950, pp. 357 to 359 and 363.

Miller et al.: Journal of Polymer Science, vol. 44, pages 391–5 (1960).

Moeller, Inorganic Chemistry (1952), page 405.

Nat. Paint, Varn. & Lacq. Assn., Abstract, Rev. No. 122, March 1947, page 104.

Okamura et al.: Die Makromolekurare Chemie, vol. 50, 1961, pp. 137–139, 146.

Schildknecht et al.: Industrial and Engineering Chemistry, vol. 41, No. 9 (1949) pages 1998–2004.

Schildknecht et al.: Industrial and Engineering Chemistry, vol. 41, No. 12 (1949) pages 2891 to 2896.

Schildknecht (2), Vinyl and Related Polymers (1952), pp. 593–625.

Sun, Modern Plastics, vol. 32, September 1954, pages 141 and 148.

Vandenberg, Jour. of Polymer Science, part C., Polymer Symposia, No. 1, 1963, pp. 207–236.

WILLIAM H. SHORT, *Primary Examiner.*

ALPHONSO D. SULLIVAN, MILTON STERMAN, JOSEPH R. LIBERMAN, HAROLD N. BURSTEIN, PHILIP E. MANGAN, H. D. ANDERSON, T. J. MORGAN, R. J. BUTTERMARK, J. T. BROWN, R. BURROUGHS, *Assistant Examiners.*

UNITED STATES PATENT OFFICE
CERTIFICATE OF CORRECTION

Patent No. 3,284,426　　　　　　　　　　　　November 8, 1966

Edwin J. Vandenberg

It is hereby certified that error appears in the above numbered patent requiring correction and that the said Letters Patent should read as corrected below.

Column 11, line 6, for "with a catalyst formed by reacting a vanadium" read -- with a two-component catalyst composition com- --.

Signed and sealed this 12th day of September 1967.

(SEAL)
Attest:

ERNEST W. SWIDER　　　　　　　　　　　　EDWARD J. BRENNER
Attesting Officer　　　　　　　　　　　　Commissioner of Patents